United States Patent
Harrison

(10) Patent No.: US 10,084,796 B2
(45) Date of Patent: *Sep. 25, 2018

(54) SYSTEM, METHOD AND COMPUTER PROGRAM PRODUCT FOR MANAGING ACCESS TO SYSTEMS, PRODUCTS, AND DATA BASED ON INFORMATION ASSOCIATED WITH A PHYSICAL LOCATION OF A USER

(71) Applicant: salesforce.com, inc., San Francisco, CA (US)

(72) Inventor: Daniel Thomas Harrison, Newmarket (CA)

(73) Assignee: salesforce.com, inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/804,906

(22) Filed: Nov. 6, 2017

(65) Prior Publication Data

US 2018/0131703 A1 May 10, 2018

Related U.S. Application Data

(63) Continuation of application No. 14/997,069, filed on Jan. 15, 2016, now Pat. No. 9,813,425, which is a continuation of application No. 14/103,786, filed on Dec. 11, 2013, now Pat. No. 9,246,892.

(60) Provisional application No. 61/807,954, filed on Apr. 3, 2013.

(51) Int. Cl.
*H04L 29/06* (2006.01)
*G06F 21/10* (2013.01)

(52) U.S. Cl.
CPC ............ *H04L 63/107* (2013.01); *G06F 21/10* (2013.01); *H04L 63/0492* (2013.01); *H04L 63/083* (2013.01); *G06F 2221/2111* (2013.01)

(58) Field of Classification Search
CPC combination set(s) only.
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |

(Continued)

OTHER PUBLICATIONS

Craig Weissman, "Programming Language Method and System for Extending APIS to Execute in Conjunction with an On-Demand Database Service," U.S. Appl. No. 60/828,192, filed Oct. 4, 2006, 66 pages.

(Continued)

*Primary Examiner* — Mahfuzur Rahman
(74) *Attorney, Agent, or Firm* — Meyertons, Hood, Kivlin, Kowert & Goetzel, P.C.

(57) ABSTRACT

In accordance with embodiments, there are provided mechanisms and methods for managing access to data based on information associated with a physical location of a user. These mechanisms and methods for managing access to systems, products, or data based on information associated with a physical location of a user can enable improved data management efficiency, enhanced data management accuracy, decreased data management costs, decreased licensing costs, increased security, additional marketing opportunities, etc.

17 Claims, 4 Drawing Sheets

(56) References Cited

U.S. PATENT DOCUMENTS

| | | |
|---|---|---|
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,646 A | 10/1999 | Fielder et al. |
| 5,963,953 A | 10/1999 | Cram et al. |
| 5,995,624 A | 11/1999 | Fielder et al. |
| 6,049,612 A | 4/2000 | Fielder et al. |
| 6,092,083 A | 7/2000 | Brodersen et al. |
| 6,105,133 A | 8/2000 | Fielder et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,718,263 B1 | 4/2004 | Glass et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,104,444 B2 | 9/2006 | Suzuki |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,548,886 B2 | 6/2009 | Kirkland et al. |
| 7,620,655 B2 | 11/2009 | Larsson et al. |
| 7,669,760 B1 | 3/2010 | Zettner |
| 7,698,160 B2 | 4/2010 | Beaven et al. |
| 7,779,039 B2 | 8/2010 | Weissman et al. |
| 7,801,304 B1 | 9/2010 | Harvey et al. |
| 7,805,749 B1 | 9/2010 | Harvey et al. |
| 7,860,131 B1 | 12/2010 | Harvey et al. |
| 7,908,638 B1 | 3/2011 | Harvey et al. |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,218,512 B2 | 7/2012 | Yaqub |
| 8,275,836 B2 | 9/2012 | Beaven et al. |
| 8,359,643 B2 | 1/2013 | Low et al. |
| 8,457,545 B2 | 6/2013 | Chan |
| 8,484,111 B2 | 7/2013 | Frankland et al. |
| 8,627,438 B1 | 1/2014 | Bhimanaik |
| 8,806,567 B1 | 8/2014 | Venable, Sr. |
| 8,832,792 B2 * | 9/2014 | Mikan .................. H04L 63/08 380/270 |
| 8,955,063 B2 | 2/2015 | Shibuya |
| 9,042,919 B2 * | 5/2015 | Trussel ............ H04L 63/0807 455/404.2 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0182194 A1 | 9/2003 | Choey et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0185842 A1 | 9/2004 | Spaur et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0223022 A1 | 10/2005 | Weissman et al. |
| 2006/0021019 A1 | 1/2006 | Hinton et al. |

(56) References Cited

U.S. PATENT DOCUMENTS

| | | |
|---|---|---|
| 2006/0136334 A1 | 6/2006 | Atkinson et al. |
| 2006/0282500 A1 | 12/2006 | Kiuchi et al. |
| 2007/0055878 A1 | 3/2007 | Sandhu et al. |
| 2007/0174082 A1 | 7/2007 | Singh |
| 2008/0172173 A1 | 7/2008 | Chang et al. |
| 2008/0195664 A1 | 8/2008 | Maharajh et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0006642 A1 | 1/2010 | Boutcher et al. |
| 2010/0082491 A1 | 4/2010 | Rosenblatt et al. |
| 2010/0100454 A1 | 4/2010 | Sines et al. |
| 2010/0174649 A1 | 7/2010 | Bouchard |
| 2010/0217880 A1 | 8/2010 | Venezia et al. |
| 2010/0293598 A1 | 11/2010 | Collart et al. |
| 2010/0299529 A1 | 11/2010 | Fielder |
| 2011/0007901 A1 | 1/2011 | Ikeda et al. |
| 2011/0047597 A1 | 2/2011 | Mahaffey et al. |
| 2011/0142234 A1 | 6/2011 | Rogers |
| 2011/0202466 A1 | 8/2011 | Carter |
| 2011/0218958 A1 | 9/2011 | Warshavsky et al. |
| 2011/0219230 A1 | 9/2011 | Oberheide et al. |
| 2011/0247051 A1 | 10/2011 | Bulumulla et al. |
| 2011/0275321 A1 | 11/2011 | Zhou et al. |
| 2011/0307699 A1 | 12/2011 | Fielder |
| 2011/0307705 A1 | 12/2011 | Fielder |
| 2011/0307706 A1 | 12/2011 | Fielder |
| 2011/0307707 A1 | 12/2011 | Fielder |
| 2011/0312278 A1 | 12/2011 | Matsushita et al. |
| 2011/0314281 A1 | 12/2011 | Fielder |
| 2012/0023099 A1 | 1/2012 | Crossley et al. |
| 2012/0042218 A1 | 2/2012 | Cinarkaya et al. |
| 2012/0066745 A1 | 3/2012 | Wuthnow et al. |
| 2012/0068812 A1 | 3/2012 | Yamamoto et al. |
| 2012/0096277 A1 | 4/2012 | Perez Soria |
| 2012/0110329 A1 | 5/2012 | Brown et al. |
| 2012/0144468 A1 | 6/2012 | Pratt et al. |
| 2012/0158821 A1 | 6/2012 | Barros |
| 2012/0159156 A1 | 6/2012 | Barham et al. |
| 2012/0159591 A1 | 6/2012 | Payne et al. |
| 2012/0166818 A1 | 6/2012 | Orsini et al. |
| 2012/0280784 A1 | 11/2012 | Gaviria Velez et al. |
| 2012/0290336 A1 | 11/2012 | Rosenblatt et al. |
| 2013/0040654 A1 | 2/2013 | Parish |
| 2013/0191884 A1 | 7/2013 | Leicher et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0262250 A1 | 10/2013 | Lingafelt et al. |
| 2013/0268304 A1 | 10/2013 | Doshi |
| 2013/0297551 A1 | 11/2013 | Smith et al. |
| 2013/0347058 A1 | 12/2013 | Smith et al. |
| 2014/0050317 A1 | 2/2014 | Sabin |
| 2014/0068723 A1 | 3/2014 | Grim et al. |
| 2014/0152421 A1 | 6/2014 | Cazanas et al. |
| 2014/0164776 A1 | 6/2014 | Hook et al. |
| 2014/0189483 A1 | 7/2014 | Awan et al. |
| 2014/0189818 A1 | 7/2014 | Meyer |
| 2014/0245015 A1 | 8/2014 | Velamoor et al. |
| 2014/0304836 A1 | 10/2014 | Velamoor et al. |
| 2014/0359537 A1 | 12/2014 | Jackobson et al. |
| 2014/0359552 A1 | 12/2014 | Misra et al. |
| 2014/0378063 A1 | 12/2014 | Nathwani et al. |
| 2015/0006289 A1 | 1/2015 | Jackobson et al. |
| 2015/0007050 A1 | 1/2015 | Jackobson et al. |
| 2015/0095162 A1 | 4/2015 | Jackobson et al. |
| 2015/0142596 A1 | 5/2015 | Jackobson et al. |
| 2015/0172563 A1 | 6/2015 | Jackobson et al. |
| 2015/0289102 A1* | 10/2015 | Trussel ............... H04L 63/0807 455/457 |

OTHER PUBLICATIONS

Office Action in U.S. Appl. No. 14/103,786 dated Jan. 27, 2015, 14 pages.

Office Action in U.S. Appl. No. 14/103,786 dated Jul. 10, 2015, 15 pages.

Office Action in U.S. Appl. No. 14/997,069 dated Dec. 6, 2016, 14 pages.

* cited by examiner

SYSTEM, METHOD AND COMPUTER PROGRAM PRODUCT FOR MANAGING ACCESS TO SYSTEMS, PRODUCTS, AND DATA BASED ON INFORMATION ASSOCIATED WITH A PHYSICAL LOCATION OF A USER

CLAIM OF PRIORITY

The present application is a continuation of U.S. application Ser. No. 14/997,069, filed Jan. 15, 2016 (now U.S. Pat. No. 9,813,425), which is a continuation of U.S. application Ser. No. 14/103,786, filed Dec. 11, 2013 (now U.S. Pat. No. 9,246,892), which claims priority to U.S. Provisional Appl. No. 61/807,954, filed Apr. 3, 2013; the disclosures of each of the above-referenced applications are incorporated by reference herein in their entireties.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to managing data access, and more particularly to managing data access based on identified information.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Licensing is a common form of controlling access to data. For example, product developers may utilize a license to control the usage of their product or access to information. Unfortunately, techniques for implementing effective licenses have been associated with various limitations. Just by way of example, current licenses do not take into consideration a multitude of environmental factors that may have an impact on the licenses. Accordingly, it is desirable to provide techniques for managing access to data based on information associated with a physical location of a user.

BRIEF SUMMARY

In accordance with embodiments, there are provided mechanisms and methods for managing access to data based on information associated with a physical location of a user. These mechanisms and methods for managing access to systems, products, and data based on information associated with a physical location of a user can enable improved data management efficiency, enhanced data management accuracy, decreased data management costs, decreased licensing costs, increased security, additional marketing opportunities, etc.

In an embodiment and by way of example, a method for managing access to systems, products, and data based on information associated with a physical location of a user is provided. In one embodiment, information associated with a physical location of a user is identified. Additionally, access to one or more of systems, products, and data is managed, based on the identified information.

While one or more implementations and techniques are described with reference to an embodiment in which managing access to systems, products, and data based on information associated with a physical location of a user is implemented in a system having an application server providing a front end for an on-demand database system capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for managing access to data based on information associated with a physical location of a user.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for managing access to data based on information associated with a physical location of a user will be described with reference to example embodiments.

Figure 1:
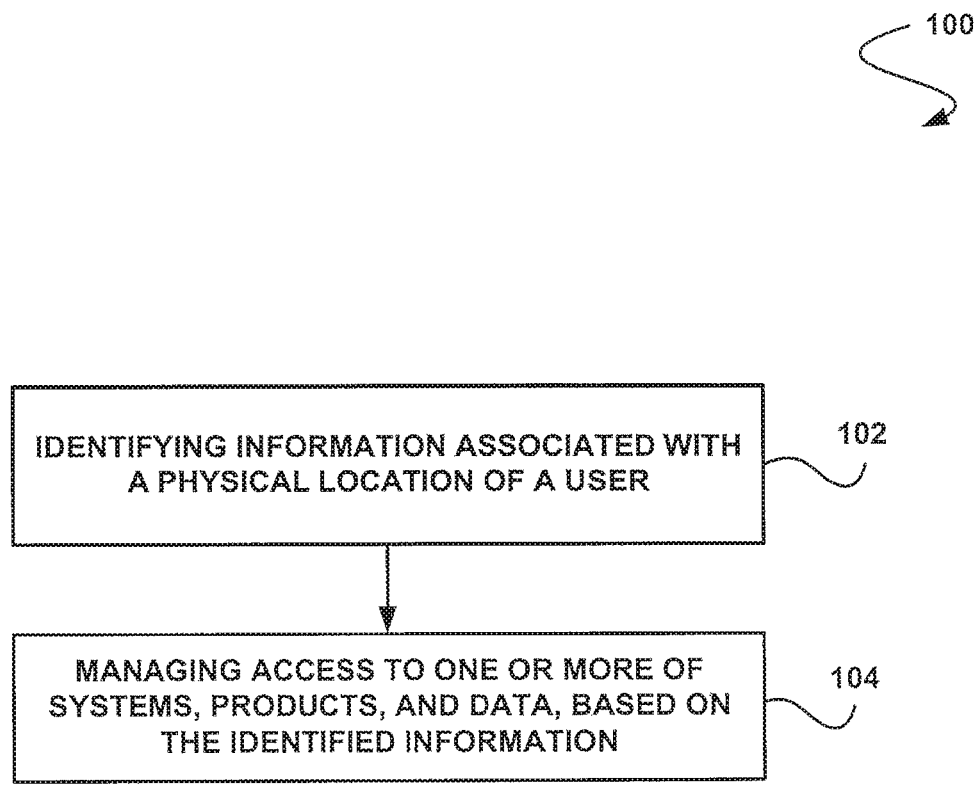
FIG. 1 illustrates a method for managing access to systems, products, and data based on information associated with a physical location of a user, in accordance with one embodiment.

FIG. 1 illustrates a method 100 for managing access to systems, products, and data based on information associated with a physical location of a user, in accordance with one embodiment. As shown in operation 102, information associated with a physical location of a user is identified. In one embodiment, the information may include current location information indicating the current physical location of the user. For example, the information may include location information indicating an exact physical location of the user, an approximate physical location of the user (e.g., a physical location accurate to within a predetermined threshold), etc.

Additionally, in one embodiment, the information may include coordinate information. For example, the information may include one or more geographical coordinates indicating the physical location of the user. In another embodiment, the information may be associated with a time. For example, the information may be associated with a time stamp that indicates a current time when the physical location of the user was determined.

Further, in one embodiment, the information may include an indication as to whether the user is within a predetermined range of a predetermined location. For example, the information may include an indication as to whether the user is within a predetermined distance from the predetermined location. In another embodiment, the information may include an indication as to whether the user is inside or within a predetermined distance from a predetermined building, vehicle, landmark, other user (e.g., a supervising manager), etc.

Further still, in one embodiment, the information associated with the physical location of the user may be identified utilizing one or more protocols. For example, the information may be identified utilizing a global positioning system (GPS) module and a GPS protocol. In another example, the information may be identified utilizing a Bluetooth (or low-energy Bluetooth) module and a Bluetooth (or low-energy Bluetooth) protocol. In yet another example, the information may be identified utilizing a radio frequency identification (RFID) module and an RFID protocol. In still another example, the information may be identified utilizing a nearfield communication module and a nearfield communication protocol. Of course, however, the information may be identified utilizing any module or modules and any protocol or protocols.

Also, in one embodiment, the information associated with the physical location of the user may be identified utilizing one or more devices. For example, the information may be identified utilizing a location aware device such as a smart phone, tablet, desktop, or other portable or non-portable computing device. In another embodiment, the information associated with the physical location of the user may be identified when it is received from another device. For example, a first device may calculate the physical location of the user and may send such calculated location to a second device. In yet another device, the physical location of the user may be identified by a multi-tenant, on-demand database system.

Additionally, it should be noted that, as described above, such multi-tenant on-demand database system may include any service that relies on a database system that is accessible over a network, in which various elements of hardware and software of the database system may be shared by one or more customers (e.g. tenants). For instance, a given application server may simultaneously process requests for a great number of customers, and a given database table may store rows for a potentially much greater number of customers. Various examples of such a multi-tenant on-demand database system will be set forth in the context of different embodiments that will be described during reference to subsequent figures.

Further still, as shown in operation 104, access to one or more of systems, products, and data is managed, based on the identified information. In one embodiment, the data may include data stored within a system. For example, the data may include data stored within a multi-tenant, on-demand database system. In another embodiment, the data may include one or more applications or services. In yet another embodiment, the data may include confidential data, text data, image data, audio data, video data, etc. In another embodiment, the one or more systems may include one or more database systems, service provider systems, information systems, or any other systems able to be accessed by one or more users. In yet another embodiment, the one or more products may include one or more applications, one or more devices, one or more services, etc.

In yet another embodiment, managing access to data may include conditionally enabling one or more portions of a license that controls the access to the data. For example, the license may include au agreement (e.g. a legal instrument, etc.) that regulates the use or distribution of the data, and one or more portions of the license may be activated, based on the information. In still another embodiment, the license may be provided by the system that stores the data (e.g., the multi-tenant, on-demand database system, etc.). Further still, the managed access may control which user can utilize specific business functions or processing logic based on that users location.

Also, in one embodiment, managing the access to data may include determining whether one or more licenses are currently available to the user, based on the identified information. For example, the information associated with the physical location of the user at a current time period may be compared against one or more predetermined criteria to determine whether one or more licenses are available to the user at the current time period. In another example, one or more licenses may be associated with a predetermined location, and such licenses may be retrieved when it is determined that the user is currently at (or within a predetermined distance from) the predetermined location.

For example, if the information associated with the physical location of the user indicates that the user is currently located at a first location, a first license allowing access to a first set of data may be retrieved and provided to the user. In another example, if the information associated with the physical location of the user indicates that the user is currently located at a second location different from the first location, a second license different from the first license may be provided to the user, where the second license allows access to a second set of data different from the first set of data.

In addition, in one embodiment, additional information may be analyzed in conjunction with the identified information in order to determine whether one or more licenses are available to the user. For example, one or more of a user identifier (ID), a password, a security key, and other information may be provided by the user and may be analyzed in addition to the information associated with the physical location of the user in order to determine whether one or more licenses are currently available to the user.

Further, managing the access to data may include allowing access to one or more portions of data according to one or more licenses if it is determined that the physical location of the user matches (or is within a predetermined distance from) one or more predetermined locations. For example, a license allowing the access of one or more databases, tables, objects, processing capability, computing resources, etc. may be activated when it is determined that the user is physically located within a predetermined area.

Further still, in one embodiment, managing the access to data may include disallowing access to one or more portions of the data if it is determined that the physical location of the user does not match (or is not within a predetermined distance from) one or more predetermined locations. For example, the license allowing the access of one or more databases, tables, objects, etc. may be deactivated when it is determined that the user is not physically located within a predetermined area.

Also, in one embodiment, managing access to the data may include conditionally providing the user with login information necessary to access predetermined data, based on the information associated with the physical location of the user. For example, if it is determined that the user is physically located within a predetermined area associated with a license, system login information (e.g., one or more of a user name, name, password, key, etc.) associated with that license may be provided to the user for logging in to a system to access predetermined data in accordance with the license. In another example, if it is determined that the user is not physically located within a predetermined area, system login information associated with the license may be withheld from the user.

Figure 2:
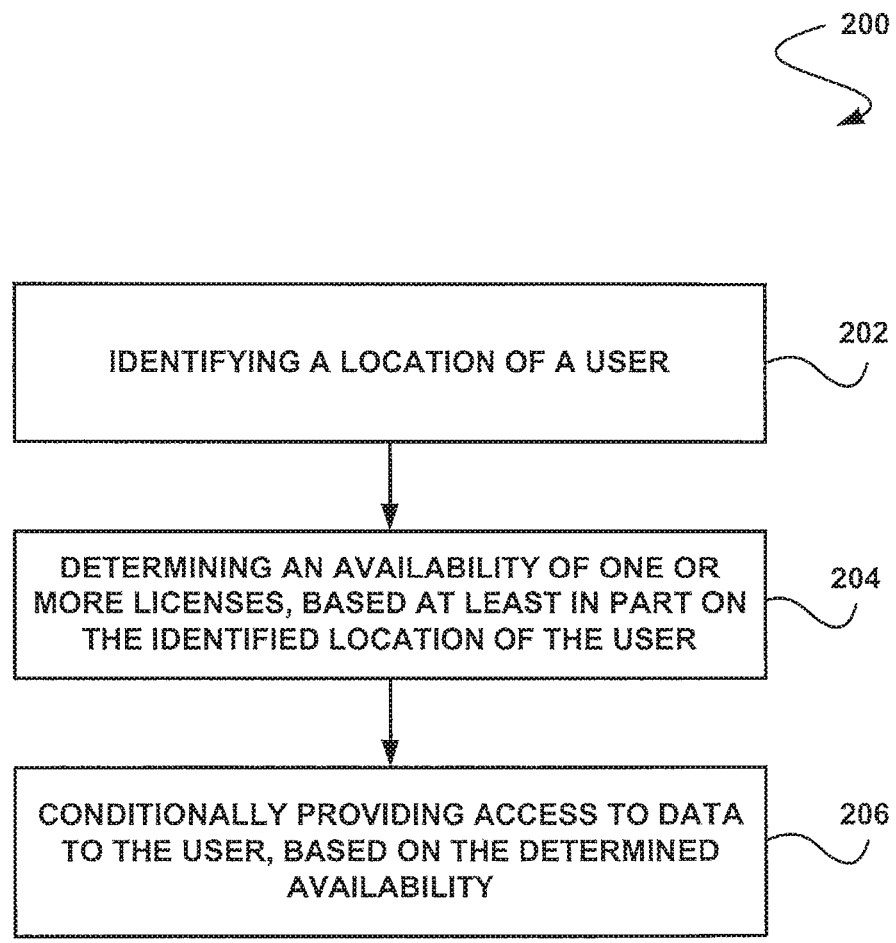
FIG. 2 illustrates a method for implementing location-based licensing, in accordance with another embodiment.

FIG. 2 illustrates a method 200 for implementing location-based licensing, in accordance with another embodiment. As an option, the method 200 may be carried out in the context of the functionality of FIG. 1. Of course, however, the method 200 may be carried out in any desired environment. The aforementioned definitions may apply during the present description.

As shown in operation 202, a location of a user is identified. In one embodiment, the location of a user may include a physical location of the user. In another embodiment, the location of the user may be identified for a particular time period (e.g., a current time period, etc.). In yet another embodiment, the location of the user may be determined by a device associated with the user. For example, the location of the user may be determined by a portable device carried by or located on the user (e.g., a portable computing device such as a cellular telephone, a communication device such as an RFID tag, etc.).

Additionally, in one embodiment, the location of the user may be identified using a near field communication (NFC) device, a CEPS device, etc. In another embodiment, additional information associated with the user may be identified. For example, an identifier of the user (e.g., one or more of a user name, password, fingerprint, retina scan, facial image, etc.) may be obtained in addition to the location of the user. In another example, a time associated with the location identification (e.g., a time at which the location of the user was identified) may also be determined.

Further, as shown in operation 204, an availability of one or more licenses is determined, based at least in part on the identified location of the user. In one embodiment, the availability may be determined at a server. For example, determining the availability of one or more licenses may include sending the identified location of the user (along with any additional information that was identified) to a server of a system (e.g., a multi-tenant, on-demand database system, etc.). In another embodiment, determining the availability of one or more licenses may include comparing the sent information to a license database (e.g., a database containing a plurality of licenses controlling data access within the system) at the server (e.g., utilizing one or more applications of the server, etc.) and determining whether the sent information matches any available licenses.

In another embodiment, determining the availability of one or more licenses may include comparing the sent information to one or more additional criteria (e.g., one or more predetermined criteria such as an acceptable predetermined location, acceptable distance from a predetermined location, acceptable identification and password information, acceptable current time, etc.) to determine if the sent information meets the one or more criteria. In yet another embodiment, one or more licenses may be determined to be available if the sent information meets the one or more criteria. In another embodiment, no licenses may be determined to be available if the sent information does not meet the one or more criteria.

Further still, in one embodiment, the availability may be determined at a client. For example, determining the availability of one or more licenses may include comparing the identified location of the user (along with any additional information that was identified) to a license database (e.g., a database containing a plurality of licenses controlling data access within the system) at the client (e.g., using one or more applications of the client, etc.) and determining whether the identified information/location matches any available licenses. In another embodiment, if a match is determined at the client, an indication of such a match (which may include an indication of the matching licenses) may be sent to a server from the client.

Also, in one embodiment, if it is determined that multiple licenses are available to the user, the user may be presented with the multiple licenses (e.g., using an interface, etc.) and may select one or more of the available licenses to be used to provide access to data. In another embodiment, all licenses determined to be available to the user may be used to provide the user with access to data.

In addition, as shown in operation 206, access to data is conditionally provided to the user, based an the determined availability. In one embodiment, if it is determined that one or more licenses are available, data access may be provided to the user in accordance with the one or more licenses. For example, an application of a user device may be able to retrieve, send, and/or store data to/from one or more databases of the system, according to the one or more licenses. In another example, one or more applications of the system may be accessed by the user, according to the one or more licenses. In another embodiment, if it is determined that one or more licenses are not available, data access may not be provided to the user.

Furthermore, in one embodiment, a charge associated with data licensing may be reduced in response to implementing location-based licensing. For example, a data and/or service provider may charge a predetermined amount for an unrestricted license to access a provided service and/or data, and may charge a reduced amount (e.g., an amount less than the predetermined amount, etc.) for a license to access a provided service and/or data where such access is restricted to a particular physical location of the user.

Further still, in one embodiment, a charge associated with a first license may be applied to data access when a user is at a first predetermined location (or within a predetermined distance from the first predetermined location), and a second charge (e.g., larger than the first charge) may be applied to data access when the user is at a second location other than the first predetermined location (or is not within a predetermined distance from the first predetermined location).

In another embodiment, a central cloud-based application may verify the availability of one or more licenses based on the user and the location of the user. In another embodiment, if a license is available, an application of the user may be allowed to connect to a server of the system, according to the license.

Also, in one embodiment, the access to data may include access to medical data. For example, members of fitness or medical clinics may want to track information related to their weight, blood pressure, etc. In another example, when a user attempts to access fitness or medical data from a mobile device, a location of the user may be submitted to a server in addition to their identification and password information. This location information may be compared to one or more criteria to determine whether a license to access fitness or medical data is available. For example, the criteria may indicate that the location of the user must be at a fitness or medical clinic at a time when the fitness or medical clinic is open (e.g., business operating hours) to obtain a license to access the fitness or medical data. In this way, the number of license-based connections may be restricted to those users who have a business case for connecting. This may reduce concurrent usage and license costs.

Additionally, in one embodiment, a non-profit organization that uses volunteers to accept donations at a drop-off location may use the technology disclosed to monitor donations that are made. This may ensure that there are no faulty products or spoiled food, which may require a full audit trail including a photo and the receiver's signature. The technology disclosed may use proximity devices to license various drop-off locations based on the proximity model and may allow the non-profit organizations to provide volunteering based licensing.

Further, in one embodiment, the technology disclosed can use business drivers for licensing products based on location. For example, a franchise with multiple store managers and assistant managers may use the technology disclosed to implement a licensing model that limits access to store location for a single manager and five other employees.

Further still, in one embodiment, the technology disclosed can use near field communication to determine and provide the keys used during a login process. In another embodiment, it GPS coordinates may be provided to verify a site location. In yet another embodiment, cellular triangulation or Wi-Fi acquired signatures may be used to verify a current location of a user.

Also, in one embodiment, a user may request classified information, where access to such information is controlled by a license. For example, a current location of the user may be sent along with an identification of the user and the request for the classified information. Such current location may be compared against criteria indicating acceptable locations to view such classified information, and the identification of the user may be compared against licenses issued to that user to view classified information. In another example, if a license exists that matches the current location of the user and the identification of the user, the license may be activated and the user may view all or some of the requested classified information according to that license. In yet another example, if no license exists that matches the current location of the user and the identification of the user, the user may not view the requested classified information.

Additionally, in one embodiment, a user may visit a predetermined location (e.g., a doctor's office, a dentist's office, etc.). Further, the user's location may be identified by a device of the user and may be sent to a server. Further still, the user's location may be compared against one or more criteria to determine whether one or more licenses are available to users at that location. For example, an entity associated with the predetermined location may purchase a license to access content (e.g., magazine data, video data, etc.), where such license may be available to all users located at the predetermined location within a predetermined time period (e.g., within the business hours of the office, etc.). Also, if it is determined that a license is available to users at the location, the license may be temporarily assigned to the user (e.g., to the device of the user), such that the user may access content in accordance with the license while the user is physically located at the predetermined location. Additionally, in on embodiment, the user's access may be related to their relative location to a secondary device or user. For example, access to personal records may be prevented if the user is trying to connect to a device while their location aware cell phone is not within the immediate vicinity of a predetermined location, and employee's access to view confidential information may be allowed while a manager's cell phone is within the immediate vicinity of the employees.

System Overview

Figure 3:
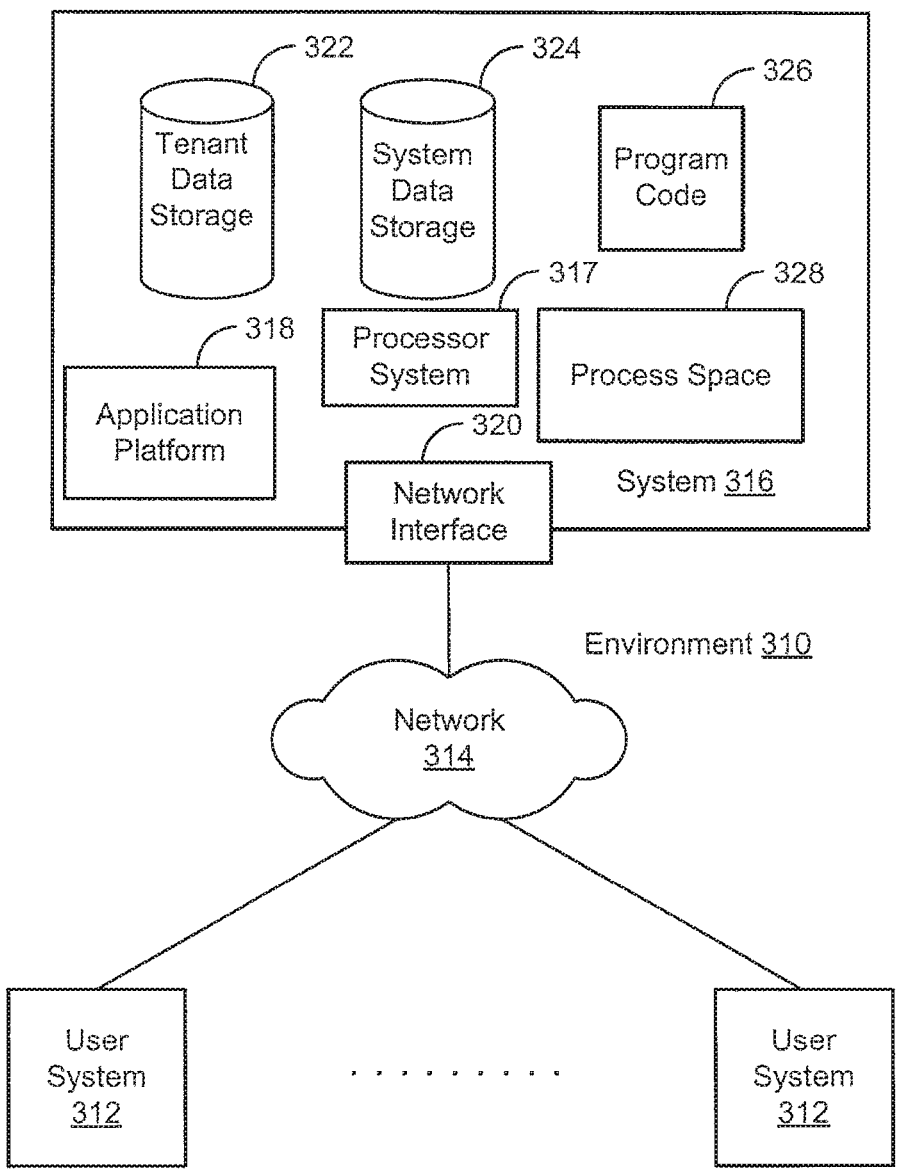
FIG. 3 illustrates a block diagram of an example of an environment wherein an on-demand database system might be used.

FIG. 3 illustrates a block diagram of an environment 310 wherein an on-demand database system might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database system exists. User system 312 may be any machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network 314 with an on-demand database system, which is system 316.

An on-demand database system, such as system 316, is a database system that is made available to outside users that do not need to necessarily be concerned with building and/or maintaining the database system, but instead may be available for their use when the users need the database system (e.g., on the demand of the users). Some on-demand database systems may store information from one or more tenants stored into tables of a common database image to form a multi-tenant database system (MTS). Accordingly, "on-demand database system 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database system 316 may include an application platform 318 that enables creation, managing and executing one or more applications developed by the provider of the on-demand database system, users accessing the on-demand database system via user systems 312, or third party application developers accessing the on-demand database system via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, hut may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of art application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known. (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
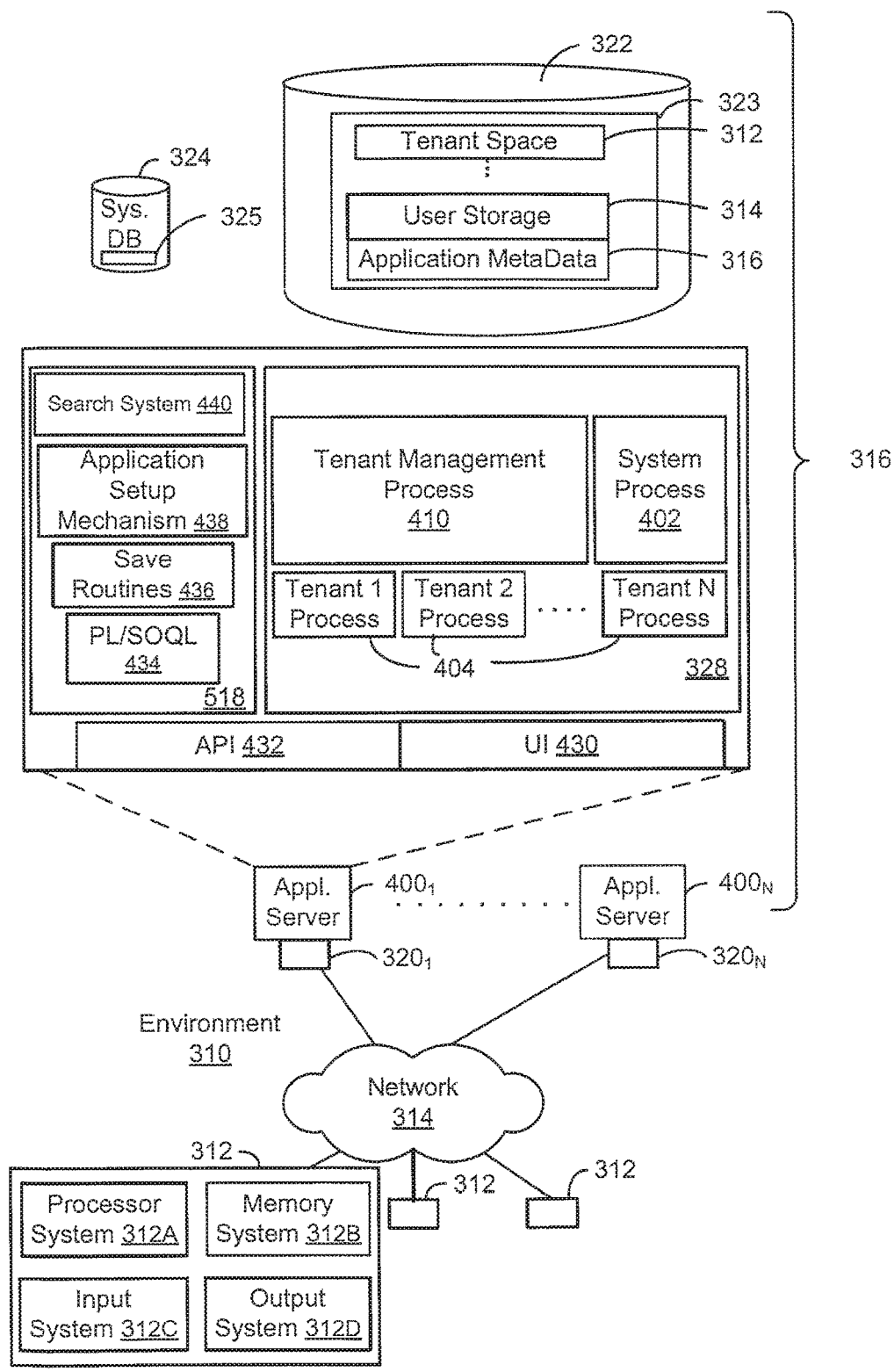
FIG. 4 illustrates a block diagram of an embodiment of elements of FIG. 3 and various possible interconnections between these elements.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D.

FIG. 4 shows network 314 and system 316. FIG. 4 also shows that system 316 may include tenant data storage 322, tenant data 323, system data storage 324, system data 325, User Interface (UI) 430, Application Program interface (API) 432, PL/SOQL 434, save routines 436, application setup mechanism 438, applications servers $400_1$-$400_N$, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 434 that provides a programming language style interface extension to API 432. A detailed description of some PL/SOQL language embodiments is discussed in commonly owned U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server 400$_1$ might be coupled via the network 314 (e.g., the Internet), another application server 400$_{N-1}$ might be coupled via a direct network link, and another application server 400$_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method, comprising:
maintaining, by a computer system, permission information indicating that a first user's access to a data store is based at least in part on a physical location of a second user, wherein the permission information further controls access to the data store based on time frame information indicative of a time frame during which the data store can be accessed;

receiving, by the computer system, location information indicating a current location of the first user and a current location of the second user, wherein the current location of the first user is determined by a device of the first user that includes a global positioning system (GPS) and the current location of the second user is determined by a device of the second user that includes a GPS, wherein the location information includes a timestamp indicative of a time at which the current location of the first user was determined;

determining, by the computer system, whether a first distance from the current location of the first user to the current location of the second user is within a predetermined distance indicated by the permission information, wherein the predetermined distance specifies a particular distance between the first user and the second user; and based on the first distance being within the predetermined distance, the computer system enabling the first user to access data within the data store, wherein enabling the first user to access the data includes determining that the time indicated by the timestamp is within the time frame indicated by the time frame information.

2. The method of claim 1, further comprising:

receiving, by the computer system, additional information indicating an updated location of the second user;

determining, by the computer system, whether a second distance from the current location of the first user to the updated location of the second user is within the predetermined distance; and based on the second distance not being within the predetermined distance, the computer system preventing the first user from accessing the data.

3. The method of claim 1, further comprising:

receiving, by the computer system, additional information indicating an updated timestamp associated with the current location of the first user; and in response to determining that a time indicated by the updated timestamp is not within the time frame, the computer system preventing the first user from accessing the data.

4. The method of claim 1, wherein enabling the first user to access the data includes:

providing, to the first user by the computer system, login information for logging into the computer system to access the data.

5. The method of claim 1, wherein the permission information indicates two or more permissions, and wherein enabling access to the data includes:

receiving, by the computer system, a selection by the first user of one of the two or more permissions such that the first user accesses particular data associated with the permission indicated by the selection.

6. The method of claim 1, wherein the permission information indicates that a particular number of users are allowed to access the data at a single time.

7. The method of claim 1, wherein the time frame information specifies one or more times of day during which the data store can be accessed.

8. A non-transitory computer readable medium having program instructions stored thereon that are capable of causing a computer system to perform operations comprising:

receiving, from a global positioning system (GPS) enabled device of a first user, location information indicating a location of the first user receiving, from a GPS-enabled device of a second user, additional location information indicating a location of the second user;

determining that the first user is within a predetermined distance from the second user based on the location of the first user and the location of the second user;

receiving an indication that identifies a time associated with the first user being within the predetermined distance from the second user;

providing the first user with access to particular data based on the first user being within the predetermined distance from the second user and the time associated with the first user being within a time frame during which access to the particular data is enabled;

subsequent to providing the first user access to the particular data, determining whether the first user is within the predetermined distance from the second user; and in response to determining that the first user is not within the predetermined distance from the second user, preventing the first user from accessing the particular data.

9. The non-transitory computer readable medium of claim 8, wherein the operations further comprise:

maintaining a set of permissions that specify, for a given permission, data that is accessible based on the first user's distance from the second user.

10. The non-transitory computer readable medium of claim 9, wherein providing the first user with access to the particular data includes:

determining two or more permissions in the set of permissions that provide access to data based on the first user being within the predetermined distance from the second user;

presenting the two or more permissions to the first user; and receiving a selection of one of the two or more permissions, wherein the selected permission specifies the particular data.

11. The non-transitory computer readable medium of claim 8, wherein providing the first user with access to the particular data includes:

providing, to the first user, system credentials that are usable by the first user to access the particular data while the first user is within the predetermined distance of the second user.

12. The non-transitory computer readable medium of claim 9, wherein providing the first user with access to the particular data includes:

receiving, from the first user, identity information usable to identify the first user; and determining at least one permission in the set of permissions that corresponds to the identity information, wherein the at least one permission specifies the particular data.

13. A system, comprising:

one or more processors; and memory having program instructions stored thereon that are executable by the one or more processors to perform operations comprising:

identifying a first location that corresponds to a first user and a second location that corresponds to a second user, wherein the first location is identified using location information from a global positioning system (GPS) enabled device of the first user and the second location is identified using location information from a GPS-enabled device of the second user, and wherein the first location is associated with a timestamp indicative of a time when the first location was determined;

determining one or more permissions based on a distance between the first location and the second locations and the time indicated by the timestamp being within a particular period of time, wherein the one or more permissions grant access to particular data, and wherein the one or more permissions are associated with the particular period of time during which the particular data can be accessed; and based on the determined one or more permissions, granting the first user access to the particular data.

14. The system of claim 13, wherein the operations further comprise:

identifying a new location that corresponds to the first user; and in response to determining that the new location is not within a particular distance of the second location that corresponds to the second user, denying the first user access to the particular data, wherein the particular distance is associated with the one or more permissions.

15. The system of claim 13, wherein the operations further comprise:

receiving a second timestamp subsequent to granting the first user access to the particular data in accordance with the one or more permissions; and in response to determining that the second timestamp specifies a time outside of the particular period of time during which the particular data can be accessed, denying the first user access to the particular data.

16. The system of claim 13, wherein determining the one or more permissions includes:

receiving, from the first user, system login information; and determining the one or more permissions by determining that the system login information corresponds to the one or more permissions.

17. The system of claim 13, further comprising a multi-tenant on-demand database system that includes the one or more processors and the memory.

* * * * *